H. HANSCOM.
SCISSORS.
APPLICATION FILED SEPT. 14, 1915.

1,182,561.

Patented May 9, 1916.

Witness
Hugh H. Ott

Inventor
Herbert Hanscom
By Victor J. Evans
Attorney

UNITED STATES PATENT OFFICE.

HERBERT HANSCOM, OF FRYEBURG, MAINE.

SCISSORS.

1,182,561. Specification of Letters Patent. Patented May 9, 1916.

Application filed September 14, 1915. Serial No. 50,648.

*To all whom it may concern:*

Be it known that I, HERBERT HANSCOM, a citizen of the United States, residing at Fryeburg, in the county of Oxford and State of Maine, have invented new and useful Improvements in Scissors, of which the following is a specification.

The present invention relates to improvements in the construction of shears or scissors, and an object of the invention is to provide one of the blades of a scissors with a reinforcing plate having an eye and which is adapted to serve as a sheath for a spring pressed knife blade and so produce a combination scissors and knife.

With the above and other objects in view, the improvement resides in the construction, combination and arrangement of the parts set forth in the following specification and falling within the scope of the appended claim.

Figure 1:
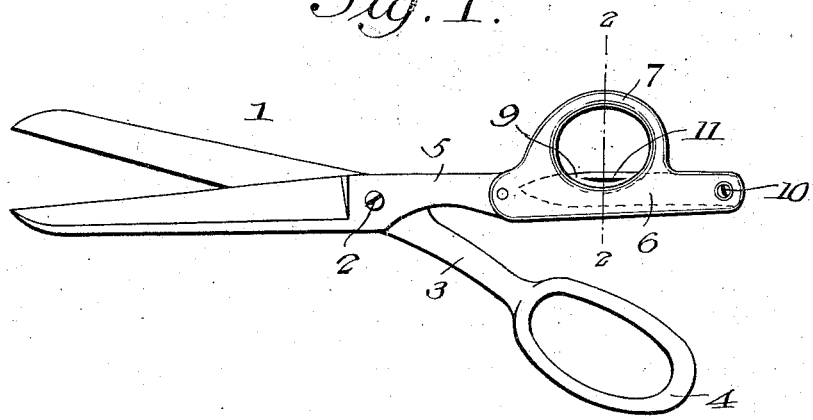
Figure 2:
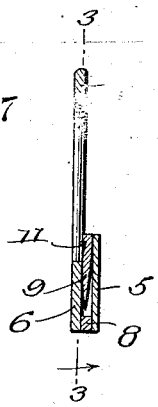
Figure 3:
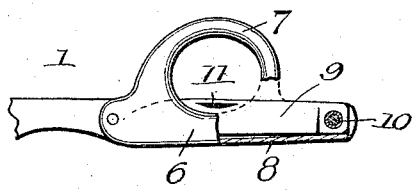

In the drawing: Figure 1 is an elevation illustrating my improvement, Fig. 2 is a transverse sectional view approximately on the line 2—2 of Fig. 1, and Fig. 3 is a longitudinal sectional view approximately on the line 3—3 of Fig. 1.

Referring now to the drawing in detail, the shears or scissors, indicated by the numeral 1, has its handle portion at its juncture with its blade pivotally connected, as at 2. The handle of one of the blades, indicated by the numeral 3 is provided with the usual eye 4 through which is adapted to be passed the thumb or finger of the user.

The handle 5 of the second blade is preferably flat and is extended a suitable distance beyond the eye end 4 of the handle.

Secured to one of the flat surfaces of the handle 1 is a flanged plate 6, the same having an enlarged outturned portion in the form of an eye 7, and this eye is adapted to accommodate one of the fingers or the thumb of the user of the scissors. Arranged upon what may be termed the lower or inner flange of the member 6 is a spring 8 which is adapted to contact with a knife blade 9, the said knife blade being pivoted, as at 10, between the member 6 and the handle 5, and the longitudinal kerf or depression 11 of the said plate is adapted to be arranged within the eye 7 of the member 6 so that the finger nail of the operator may engage with the said kerf or depression 11 to swing the knife blade to an open position, and the spring 8 is adapted to sustain the knife blade in either its open or its closed position.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In combination, a scissors having the shank of one of its blades formed with an eye, the shank of the second blade being extended longitudinally and having a plate secured thereto, said plate being formed at its medial portion with an eye, said eye projecting beyond the shank of the blade, a knife blade pivoted between the plate and the shank at the outer end thereof, a spring contacting with the knife, said knife having a longitudinal depression adapted to be arranged in the high portion of the plate when the blade is swung to its closed position thereby giving access to the depression when the blade is in folded position.

In testimony whereof I affix my signature in presence of two witnesses.

HERBERT HANSCOM.

Witnesses:
 HUGH W. HASTINGS,
 E. E. HASTINGS.

Copies of this patent may be obtained for five cents each, by addressing the "Commissioner of Patents, Washington, D. C."